(12) United States Patent   (10) Patent No.: US 7,758,130 B2
Jay   (45) Date of Patent: Jul. 20, 2010

(54) ROTATIONAL VEHICLE RESTRAINT SYSTEM

(76) Inventor: Michael A. Jay, 6 Overlook Dr., Laurel Hollow, NY (US) 11791

( * ) Notice: Subject to any disclaimer, the term of this patent is extended or adjusted under 35 U.S.C. 154(b) by 0 days.

(21) Appl. No.: 11/903,921

(22) Filed: Sep. 24, 2007

(65) Prior Publication Data

US 2009/0079253 A1    Mar. 26, 2009

(51) Int. Cl.
 *B60R 22/06* (2006.01)
(52) U.S. Cl. .................. 297/473; 297/474; 297/465; 297/468
(58) Field of Classification Search .............. 297/468, 297/473, 474, 465
See application file for complete search history.

(56) References Cited

U.S. PATENT DOCUMENTS

| | | | | |
|---|---|---|---|---|
| 1,712,198 A | * | 5/1929 | Clapp | 297/473 |
| 2,695,052 A | * | 11/1954 | Yates et al. | 297/473 |
| 2,726,714 A | * | 12/1955 | McAndrews | 297/473 |
| 2,833,343 A | * | 5/1958 | Benson | 297/473 |
| 3,028,200 A | * | 4/1962 | Dye | 297/484 |
| 3,169,036 A | * | 2/1965 | Spooner | 297/256 |
| 3,301,594 A | * | 1/1967 | Pukish, Jr. | 297/467 |
| 3,321,247 A | * | 5/1967 | Dillender | 297/465 |
| 3,529,864 A | * | 9/1970 | Sharp et al. | 297/467 |
| 4,706,992 A | * | 11/1987 | Downing et al. | 280/801.1 |
| 5,131,682 A | | 7/1992 | Reed | |
| 6,217,069 B1 | | 4/2001 | Ganesan | |

* cited by examiner

*Primary Examiner*—David Dunn
*Assistant Examiner*—James Alex
(74) *Attorney, Agent, or Firm*—Kenyon & Kenyon LLP (57) ABSTRACT

A rotational vehicle restraint system includes an anchoring component configured to be attached to a vehicle seat assembly; a rotatable component attached to the anchoring component and configured to rotate relative to the anchoring component about an axis of rotation; and a harness connected to the rotatable component and configured to fit about a passenger. When installed in a vehicle, the rotational vehicle restraint system is configured to restrain a passenger fitted with the harness in both an upright sitting position and a lying down position. When installed in a vehicle, the rotational vehicle restraint system is also optionally configured to enable the passenger fitted with the harness to change from a first lying down position facing forward in the vehicle seat assembly to a second lying down position facing backward in the vehicle seat assembly.

14 Claims, 11 Drawing Sheets

ROTATIONAL VEHICLE RESTRAINT SYSTEM

BACKGROUND INFORMATION

Automobiles and other vehicles typically include seat assemblies which accommodate more than one person sitting in an upright position. When these seat assemblies are not occupied by their intended number of upright-sitting people, they may include enough lateral space for a single person to lie down horizontally, i.e., in a sleeping or horizontal resting position. However, this potential of a multi-person vehicle seat assembly to allow a person to lie down is typically very difficult to utilize in a safe manner.

For example, typical passenger restraint systems, e.g., conventional seat belts, are only designed to safely restrain a person when that person is in an upright or sitting position. Such typical passenger restraint systems do not even attempt to address the problem of safely restraining a person in a lying down position. Attempts to directly address the problem of restraining a person in the lying down position have critical shortcomings. For example, in the case of U.S. Pat. No. 5,131,682, the shown apparatus appears to provide little restraint, and is furthermore not securely attached to the passenger. In the case of U.S. Pat. No. 6,217,069, the shown apparatus is an unwieldy combination of belts which may be difficult for the passenger to arrange correctly, and which may undesirably limit the movement of the passenger when in the lying down position.

There is also a further problem that is not addressed by either conventional seat belts or the above-identified apparatuses for restraining passengers in the lying down position. That is, during the course of a trip in the vehicle, and possibly even many times over the course of the trip, a passenger may desire to switch between the upright and lying down positions. However, this is not possible in the case of either conventional seat belts or the above-identified apparatuses because both conventional seat belts and the above-identified apparatuses are directed to restraining a passenger only in one or the other of the upright and lying down positions. Neither conventional seat belts nor the above-identified apparatuses provide a device that allows a passenger to switch between the upright and lying down positions without necessitating that the passenger release themselves from the restraint system to do so, which is undesirably dangerous during the course of a trip in the vehicle.

BRIEF DESCRIPTION OF THE DRAWINGS

So that features of the present invention can be understood, a number of drawings are described below. It is to be noted, however, that the appended drawings illustrate only particular embodiments of the invention and are therefore not to be considered limiting of its scope, for the invention may encompass other equally effective embodiments.

DETAILED DESCRIPTION

Figure 1:
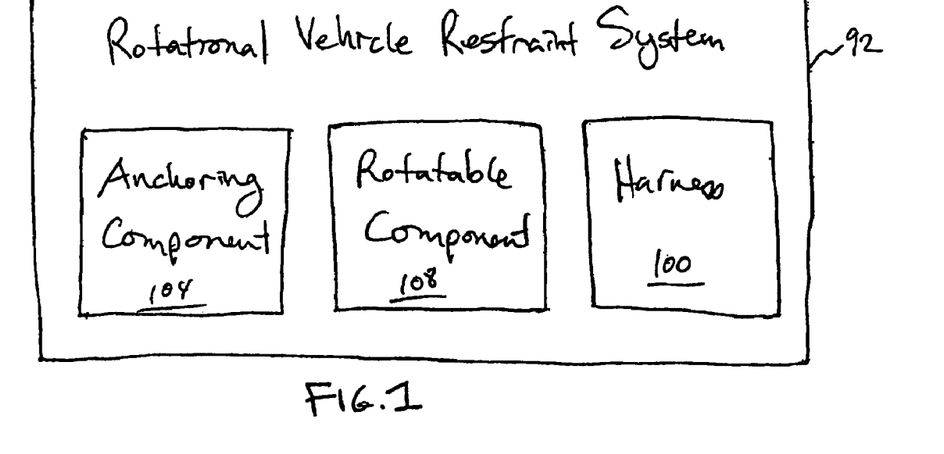
FIG. 1 depicts a schematic view of one embodiment of a rotational vehicle restraint system.

FIG. 1 depicts a rotational vehicle restraint system 92 that, when installed in a vehicle, allows a passenger to occupy either an upright, sitting position or a lying down position on the seat assembly while being safely restrained in both positions. The passenger can also transition from the upright sitting position to the lying down position, and vice versa, all the while being safely restrained by, and not needing to be released from, the rotational vehicle restraint system 92. The rotational vehicle restraint system 92, when installed in the vehicle, can also be optionally configured to enable the passenger to change from a first lying down position, facing forward, to a second lying down position, facing backward, also all the while being safely restrained.

The rotational vehicle restraint system 92 includes an anchoring component 104, a rotatable component 108 and a harness 100. The anchoring component 104 anchors the rotational vehicle restraint system 92 to a vehicle seat assembly and maintains a substantially fixed position during operation of the rotational vehicle restraint system 92. The rotatable component 108 is capable of rotating relative to the anchoring component 104, about an axis of rotation, during operation of the rotational vehicle restraint system 92. The rotation of the rotatable component 108 relative to the anchoring component 104 enables the passenger to transition from the upright sitting position to the lying down position while being restrained by the rotational vehicle restraint system 92. The harness 100 secures the passenger to the rotatable component 108.

Differing physical embodiments of the anchoring component 104, rotatable component 108, and harness 100 are possible, and are included within the scope of this invention, so long as the anchoring component 104 anchors the rotational vehicle restraint system 92 to the vehicle seat assembly and remains in a substantially fixed position relative to the vehicle seat assembly, and allows the rotatable component 108 to rotate relative to the anchoring component 104 about an axis of rotation, while the harness 100 secures the passenger to the rotatable component 108.

Figure 2A:
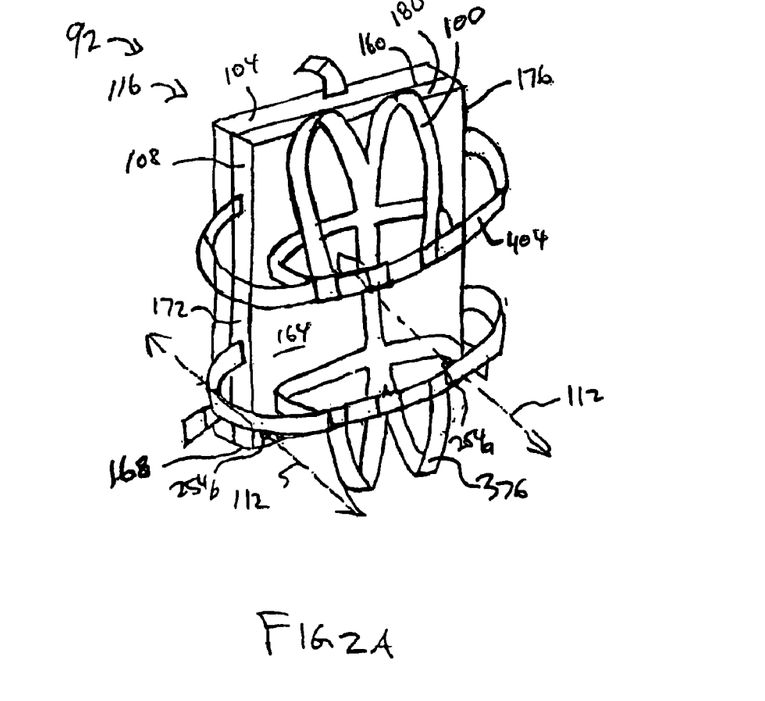
FIG. 2A depicts a perspective view of one embodiment of the rotational vehicle restraint system in a first configuration that enables a passenger to be restrained in an upright sitting position.
Figure 2B:
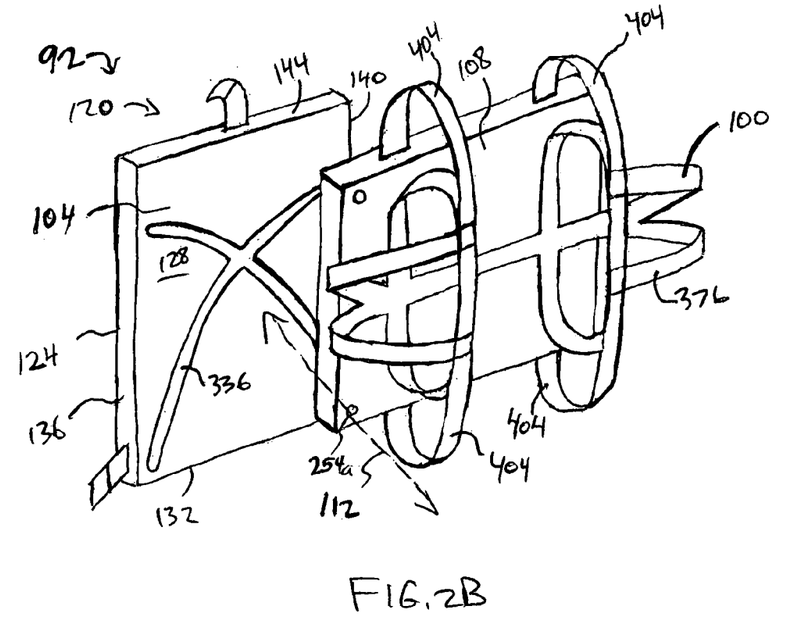
FIG. 2B depicts a perspective view of the embodiment of the rotational vehicle restraint system depicted in FIG. 2A, but in which the rotational vehicle restraint system is in a second configuration that enables the passenger to be restrained in a lying down position.

FIGS. 2A and 2B depict perspective views of one embodiment of the rotational vehicle restraint system 92 that enables the passenger to transition from an upright sitting position to a lying down position. In a first configuration 116, the rotatable component 108 is at a first rotational position relative to the anchoring component 104. For example, in the first configuration 116 depicted in FIG. 2A, both the rotatable component 108 and the anchoring component 104 are in a vertical position, and thus the rotatable component 108 is substantially aligned with the anchoring component 104.

FIG. 2B depicts the embodiment of the rotational vehicle restraint system depicted in FIG. 2A, but in which the rotational vehicle restraint system 92 has transitioned to a second configuration 120 wherein the passenger is in the lying down position. In the second configuration 120, the rotatable component 108 is at a second rotational position relative to the anchoring component 104. For example, in the second configuration 120 depicted in FIG. 2B, the rotatable component 108 is rotated about 90 degrees relative to its position as part of the first configuration 116 depicted in FIG. 2A, and thus the rotatable component 108 is now in a horizontal position and the anchoring component 104 remains in a vertical position.

In the embodiment depicted in FIGS. 2A and 2B, the anchoring component 104 and the rotatable component 108 are panels (i.e., slabs). The anchoring component panel 104 has a rear surface 124 which faces towards a backrest of the vehicle seat assembly, and a front surface 128 which faces toward the rotatable component 108. The anchoring component panel 104 also has a bottom surface 132, a left side surface 136, a right side surface 140 and a top surface 144. The anchoring component panel 104 has a predetermined characteristic thickness, width and height. In a similar manner, the rotatable component panel 108 as has a rear surface 160 which faces towards the anchoring component 104, a front surface 164 which faces toward the front of the vehicle when installed in the vehicle seat assembly, a bottom surface 168, a left side surface 172, a right side surface 176, a top surface 180, and a predetermined characteristic thickness, width and height.

Although the anchoring component 104 and the rotatable component 108 are depicted in FIGS. 2A and 2B as being substantially rectilinear panels, deviations from rectilinear forms are possible and included within the scope of the invention. Generally speaking, the anchoring component 104 and the rotatable component 108 can each be any suitable three-dimensional form that performs the functionality of these components as discussed above. For example, the anchoring component 104 and the rotatable component 108 can include three-dimensional geometrical forms other than panels, and can also include three-dimensional geometrical forms which are different from each other. Nonetheless, however, the specific physical embodiments of the anchoring component 104 and the rotatable component 108 described herein may have specific advantages.

Differing embodiments of the surfaces of the anchoring component 104 and the rotatable component 108 are possible. For example, the rear surface 124 of the anchoring component 104 can be a substantially flat planar surface. The flat planar rear surface 124 may provide compatibility with a wide variety of differently-contoured vehicle seat assembly backrests. Additionally, the front surface 128 of the anchoring component 104 and the rear surface 160 of the rotatable component 108 can also be substantially flat planar surfaces. The flat planar front surface 128 of the anchoring component 104 and the flat planar rear surface 160 of the rotatable component 108 may provide compatibility with each other during the rotation of the rotatable component 108 relative to the anchoring component 104. For example, as the rotatable component 108 rotates relative to the anchoring component 104, the flat planar rear surface 160 of the rotatable component 108 is able to move relatively smoothly across the flat planar front surface 128 of the anchoring component 104, without encountering obstructions.

Figure 3:
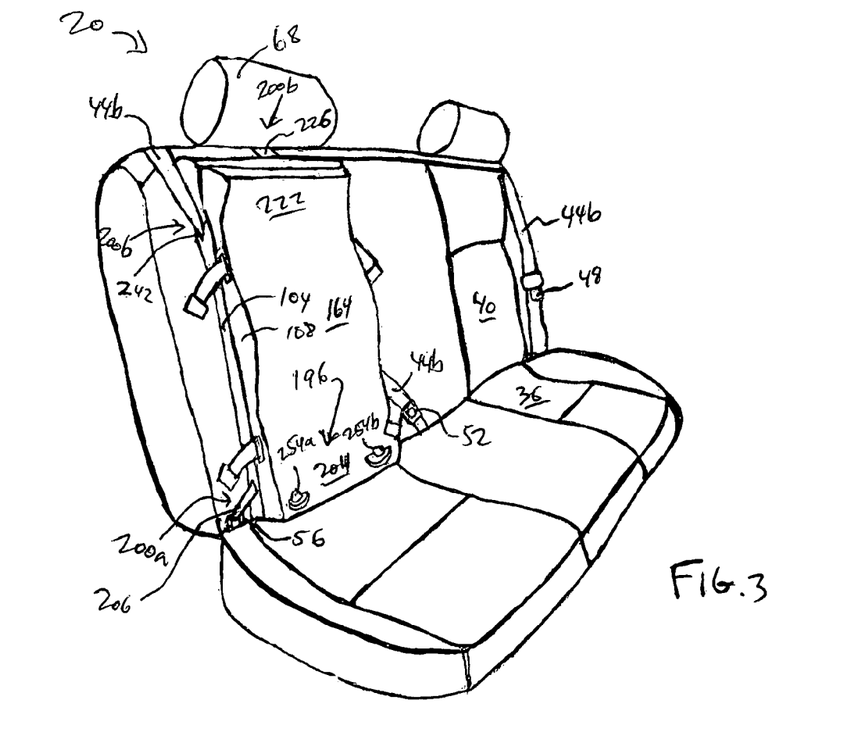
FIG. 3 depicts a perspective view of one embodiment of an anchoring component and a rotatable component of the rotational vehicle restraint system connected to one embodiment of a vehicle seat assembly.

Further, the front surface 164 of the rotatable component 108 can be contoured to, for example, provide comfort to the passenger using the rotational restraint system 92. FIG. 3, for example, depicts one embodiment of the anchoring component 104 and rotatable component 108 of the rotational vehicle restraint system 92, installed on a vehicle seat assembly 20 of a vehicle, in which the rotatable component 108 includes the contoured front surface 164. The contoured front surface 164 optionally includes a lumbar support area 196. The front surface 164 of the rotatable component 108 can also be a surface of a cushioned layer to, for example, provide further comfort to the passenger. Other embodiments of the rear and front surfaces 124, 128 of the anchoring component 104, and the rear and front surfaces 160, 164 of the rotatable component 108 may also provide the advantages discussed above, such as compatibility with a wide variety of vehicle seat assemblies, a smooth rotation of the rotatable component 108, and comfort to the passenger.

Figure 4:
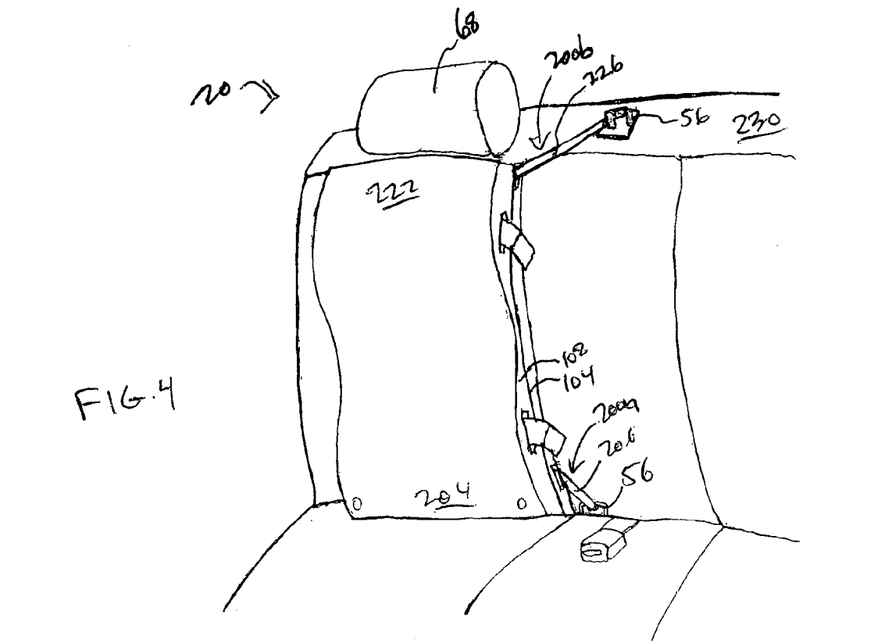
FIG. 4 depicts a perspective view of another embodiment of the anchoring component and rotatable component connected to the vehicle seat assembly.
Figure 5:
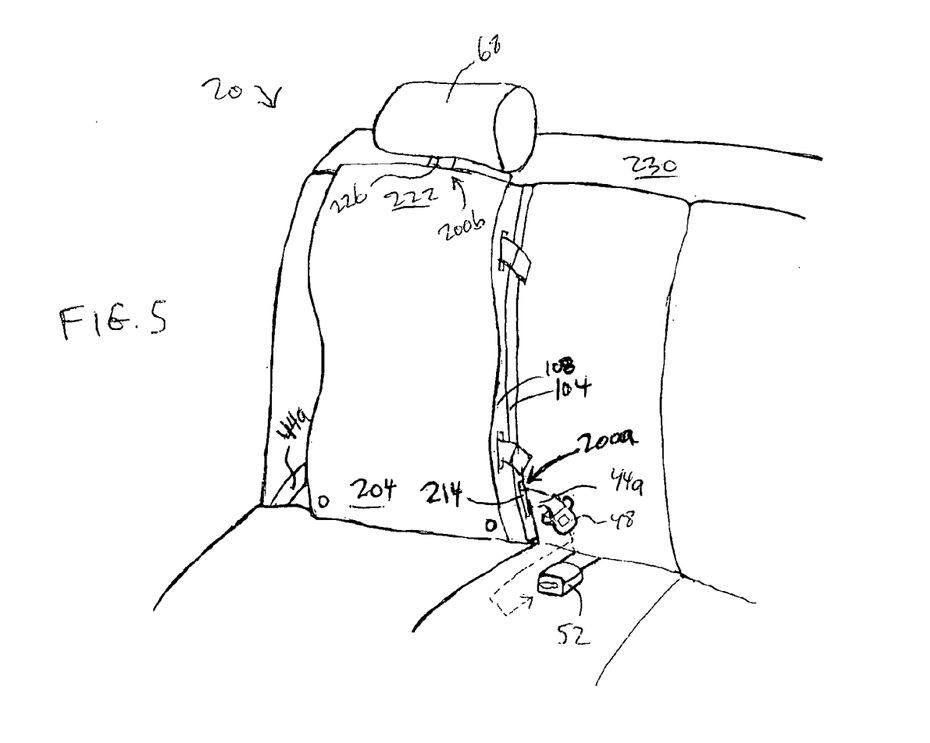
FIG. 5 depicts a perspective view of yet another embodiment of the anchoring component and rotatable component connected to the vehicle seat assembly.

FIGS. 3, 4 and 5 are perspective views depicting embodiments of the anchoring component 104 and rotatable component 108, with the anchoring component 104 attached to a vehicle seat assembly 20 by a plurality of anchoring connectors 200. For purposes of clarity in describing the attachment of the anchoring component 104 to the vehicle seat assembly 20, the depictions of FIGS. 3, 4 and 5 do not include the harness 100. FIGS. 3, 4 and 5 depict the anchoring component 104 and rotatable component 108 in the first configuration 116 of the rotational vehicle restraint system 92, installed in the right-hand side of the vehicle seat assembly 20. However, the rotational vehicle restraint system 92 can be installed on either side, or in the middle, of the vehicle seat assembly 20.

The vehicle seat assembly 20 can be part of many different types of vehicles, such as, for example, automobiles (including sedans, station wagons, busses, trucks, vans, mini-vans, etc.), planes and boats. The vehicle seat assembly 20 includes a seat, a seat assembly restraint system, and a frame (not shown). The seat includes a base 36 and a backrest 40. The seat assembly restraint system includes a seat belt 44, which typically includes a tab 48, and a seat buckle 52, which mates to the tab 48 to connect the seat belt 44 to the seat buckle 52. The seat belt 44 extends from, and retracts back into, a seat belt base unit (not shown). The seat belt base unit typically includes a tensioning device (not shown) that picks up any slack in the seat belt 44 to at least partially conform the length of the seat belt 44 to the passenger. The seat belt base unit also typically includes a sensor (not shown), for example an accelerometer, to determine when to enable and disable extension of the seat belt 44, such as during normal operation or in the event of an accident of the vehicle.

The frame of the vehicle seat assembly 20 supports the seat, and can be either an integral portion of the main frame (not shown) of the vehicle, or a frame specific to the vehicle seat assembly 20 which is connected to the vehicle. For purposes of this description, the frame used to support the seat, whether it be a portion of the main frame of the vehicle or a frame specific to the vehicle seat assembly 20, will be regarded as the frame of the vehicle seat assembly 20.

The vehicle seat assembly 20 typically includes a frame connector 56 which is securely attached to the frame. The frame connector 56 can be used to securely attach objects to the frame. For example, automobiles may be required by federal regulations to provide the frame connector 56 for secure attachment of child safety seats to the vehicle seat assembly 20. The frame connector 56 can include a metal hook that is welded to the frame of the vehicle seat assembly 20. The hook is typically somewhat concealed by cushioning of the seat until it is needed, at which point a passenger can easily find it by looking closely at the area of the intersection of the seat base 36 and backrest 40.

Differing embodiments of the vehicle seat assembly 20 are possible. For example, the seat belt 44 can be a waist-oriented seat belt 44a (depicted in FIG. 5), which extends about the waist area of the passenger and typically extends from and retracts into the seat belt base unit through the intersection of the base 36 and the backrest 40. The seat belt 44 can also be a shoulder-oriented seat belt 44b (depicted in FIG. 3), which at least partially extends from and retracts into an area about the shoulder of the passenger. The vehicle seat assembly 20 can include both waist-oriented seat belts 44a and shoulder-oriented seat belts 44b. The tab 48 (depicted in FIG. 5) can typically also be adjustably-positioned along the seat belt 44 to accommodate differently-sized passengers. The vehicle seat assembly 20 can include an ergonomic contouring of the seat (depicted in FIG. 3), including relatively sculpted depressions to accommodate passengers. The vehicle seat assembly 20 can also optionally include a headrest 68.

The anchoring component 104 is capable of being securely attached to the vehicle seat assembly 20 by an anchoring connector 200 or a plurality of anchoring connectors 200. The anchoring component 104 can optionally be attached to the vehicle seat assembly 20 in accordance with federal regulations that govern attachment of supplementary restraint systems such as, for example, child safety seats (not shown), to the vehicle seat assembly 20. For example, federal regulations may require that a particular restraint system be attached to the vehicle seat assembly 20 at both a top portion and a bottom portion of the restraint system.

A bottom anchoring connector 200a can include a strap 206 that connects the bottom portion 204 of the anchoring component 104 to the vehicle seat assembly 20. The strap 206 can be either permanently or detachably connected to the bottom portion 204 of the anchoring component 104. FIGS. 3 and 4 depict embodiments in which the bottom anchoring connector strap 206 attaches the bottom portion of the anchoring component 104 to the frame connector 56. The bottom anchoring connector strap 206 can optionally include a hook or clasp that connects to the frame connector 56, or optionally include a strap portion which ties to the frame connector 56.

Figure 6:
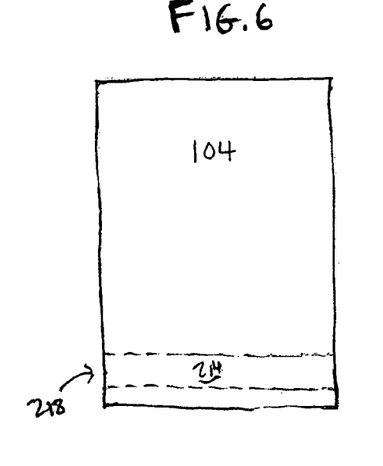
FIG. 6 depicts a front or rear view of one embodiment of the anchoring component having a connector slot capable of receiving a waist oriented seat belt.

The bottom anchoring connector 200a of the anchoring component 104 can also optionally connect the bottom portion 204 of the anchoring component 104 to the seat buckle 52 of the vehicle seat assembly 20. For example, FIG. 5 depicts one embodiment of the bottom anchoring connector 200a which includes a slot 214 that is capable of receiving the waist-oriented seat belt 44a on one side and divulging the seat belt 44a on the other side to engage the seat buckle 52. FIG. 6 depicts a rear or front view of one embodiment of the bottom anchoring connector slot 214 (shown in dashed lines) of the anchoring component 104. Also, instead of including the slot 214, the bottom anchoring connector 200a can optionally have its own tab 48 which mates to the seat buckle 52.

A top anchoring connector 200b can include a strap 226 that connects a top portion 222 of the anchoring component 104 to the vehicle seat assembly 20. The strap 226 can be either permanently or detachably connected to the top portion 222. FIG. 4 depicts one embodiment in which the vehicle seat assembly 20 has an additional frame connector 56 located at the center of a shoulder 230 of the vehicle seat assembly 20, and the top anchoring connector strap 200b attaches to the additional frame connector 56. The vehicle seat assembly 20 can optionally have additional frame connectors 56 in other locations, such as at a bottom-rear portion of the vehicle seat assembly 20. The top anchoring connector strap 226 can optionally attach the top portion 222 of the anchoring component 104 to the bottom-rear portion of the vehicle seat assembly 20 by extending over the top, and then behind the vehicle seat assembly 20.

Figure 7A:
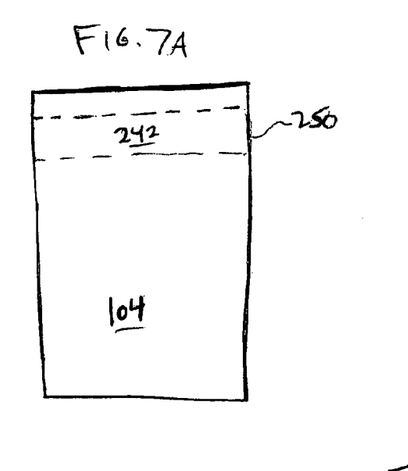
FIGS. 7A, 7B and 7C depict front and rear views of embodiments of the anchoring component having a connector slot capable of receiving a shoulder-oriented seat belt.
Figure 7B:
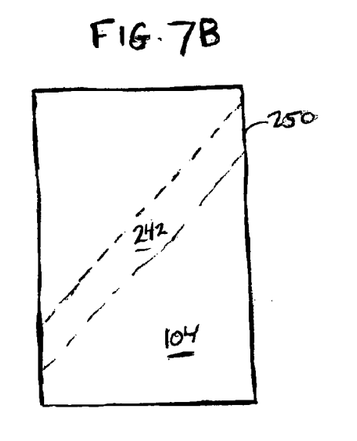
Figure 7C:
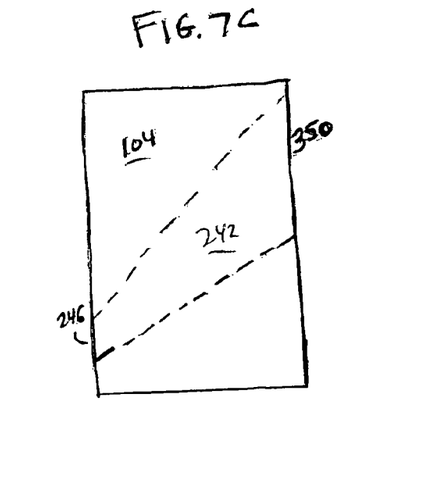

The anchoring component 104 can also include an anchoring connector slot 242 capable of receiving the shoulder-oriented seat belt 44b to connect the anchoring component 104 to vehicle seat assembly 20. FIG. 3 depicts one embodiment in which the shoulder-oriented seat belt 44b is received by the anchoring connector slot 242 on one side of the anchoring component 104 and exits on the other side to engage the seat buckle 52. FIGS. 7A, 7B and 7C depict rear or front views of several embodiments of the anchoring connector slot 242 (shown in dashed lines). FIG. 7A depicts an embodiment in which the slot 242 passes along the top portion 222 of the anchoring component 104. FIG. 7B depicts an embodiment in which the slot 242 passes from the top portion 222 on one side to the bottom portion 204 on the other side and has a substantially constant width. FIG. 7C depicts an embodiment in which the slot 242 passes from the top portion 222 on one side to the bottom portion 204 on the other side and has a greater width with on a seat-belt-receiving side than it does on a seat-belt-exiting side.

Returning to FIG. 2A, the depicted embodiment includes a plurality of pivots 254 spatially offset from each other and about which the rotatable component 108 rotates, including a first pivot 254a located in a bottom right corner of the rotational restraint system 92 (as viewed from the front, i.e., from a position more forward in the vehicle) and a second pivot 254b located in a bottom left corner. Although FIG. 2A depicts a plurality of pivots 254, the rotational vehicle restraint system 92 can optionally include a single pivot 254. To transition from the first configuration 116 to the second configuration 120 of the rotational vehicle restraint system 92, the rotatable component 108 is capable of rotating relative to the anchoring component 104 about an axis of rotation 112 passing through the pivot 254. To enable the rotational vehicle restraint system 92 to be installed on either side of the vehicle seat assembly 20, the rotatable component 108 is optionally capable of rotating about a plurality of different axes of rotation 112, each passing through one of the plurality of pivots 254, to accommodate either a passenger sitting in the left seat to lie down toward the right, or a passenger sitting in the right seat to lie down toward the left. The specific pivot 254 about which the rotatable component 108 rotates is selectable by the passenger 54. That is, each of the depicted pivots 254 is capable of being selectively engaged by the passenger to create the axis of rotation 112 associated with the selected pivot 254.

Figure 8A:
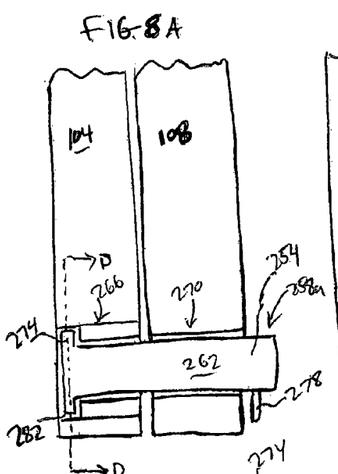
FIGS. 8A, 8B and 8C depict a side cross-sectional view, a front view and a perspective view, respectively, of an embodiment of a pin device capable of acting as a pivot.
Figure 8B:
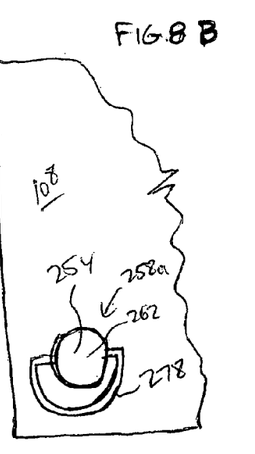
Figure 8C:
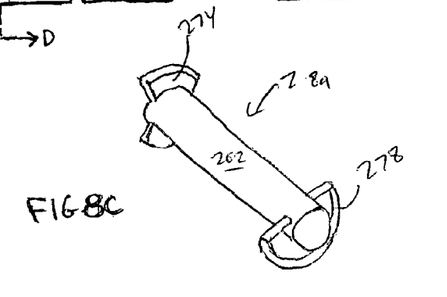

The pivot 254 can include a pin device 258 which is capable of being selectively engaged. FIGS. 8A, 8B and 8C depict a partial cross-sectional view, a partial front view and a perspective view, respectively, of an embodiment of a pin device 258a. Although exemplary embodiments are specifically described herein, many embodiments of the pin device 258 are possible. For example, the pin device 258 can include a rod 262 which can be inserted into corresponding receiving slots 266, 270 in the anchoring component 104 and the rotatable component 108, respectively. The pin device 258 can be designed such that either the rod 262 rotates relative to the anchoring component 104, or the rotatable component 108 rotates about the rod 262.

Figure 8D:
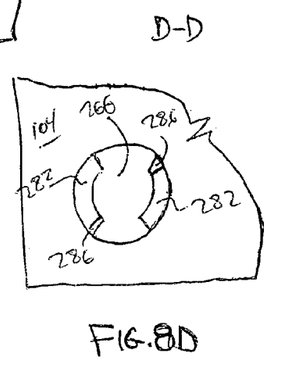
FIG. 8D depicts a partial cross-sectional profile view of an embodiment having a receiving slot in the anchoring component that is capable of receiving the pin device depicted in FIGS. 8A, 8B and 8C.

The exemplary embodiment of the pin device 258a depicted in FIGS. 8A, 8B and 8C includes a permanent tab 274 at one end and a detachable ring or clip 278 at the other end. The receiving slot 266 in the anchoring component 104 has a profile which accommodates the tab 274, and a retaining portion 282 at one end which is capable of locking the pin device 258a into a fixed position relative to the anchoring component 104. FIG. 8D shows a partial cross-sectional view of one embodiment of the profile of the receiving slot 266 in the anchoring component 104. The passenger can lock the pin device 258a into the fixed position, or release the pin device 258a from the fixed position, by gripping and twisting the ring 278. In the depicted embodiment, the retaining portion 282 has an end block 286 which stops the rotation of the pin device 258a once it has reached the locked position. The pin device 258a can be used as the pivot 254 when it has been locked into position, and thus the passenger 54 can engage the pin device 258a to select it as the pivot 254. Once the pin device 258a is released from the locked position, that pin device 258a is not used as the pivot 254.

Figures 9A, 9B:
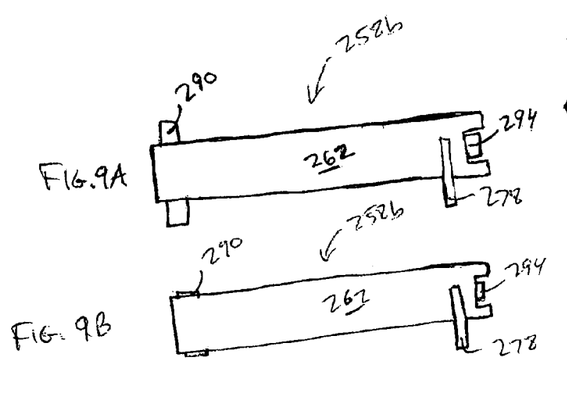
FIGS. 9A, 9B and 9C depict a first side view, a second side view and a perspective view, respectively, of another embodiment of the pin device capable of acting as the pivot.
Figure 9C:
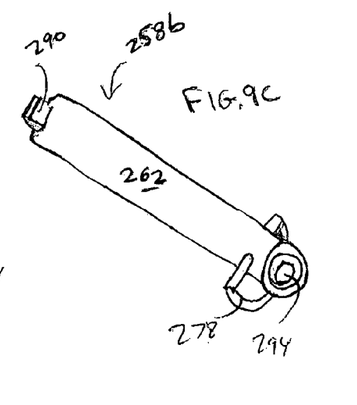

FIGS. 9A and 9B depict side views, and FIG. 9C depicts a perspective view, of another exemplary embodiment of the pin device 258b that can be used as the pivot 254. The depicted embodiment of the pin device 258b comprises a retractable tab 290 at one end, a button 294 at the other end, and an internal spring mechanism (not shown). The tab 290 is capable of being retracted upon a pressing of the button 294.

Figure 10A:
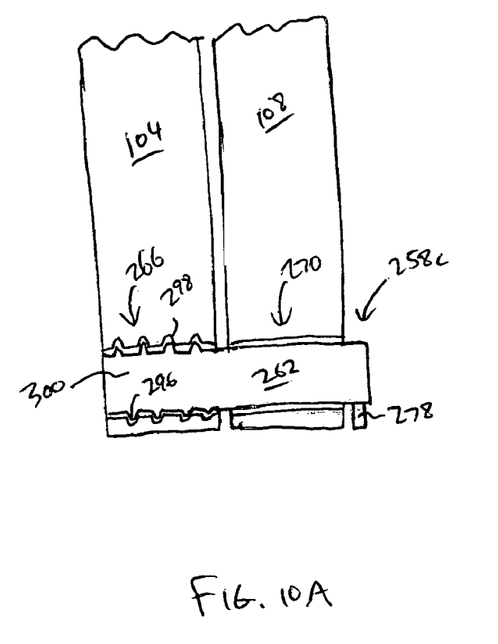
FIGS. 10A and 10B depict a side cross-sectional view and a perspective view, respectively, of yet another embodiment of the pin device capable of acting as the pivot.
Figure 10B:
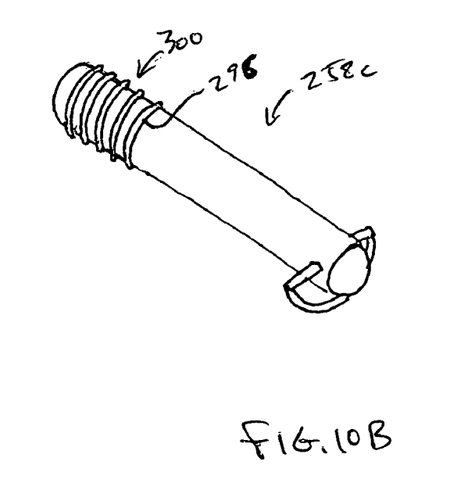

FIGS. 10A and 10B depict a partial cross-sectional view and a perspective view, respectively, of yet another exemplary embodiment of the pin device 258c that can be used as the pivot 254. The depicted embodiment of the pin device 258c has threads 296 over a portion 300 of the pin shaft 262 that is received by the anchoring component receiving slot 266, which in this embodiment has corresponding grooves 298 to receive the threads 296. The passenger can engage and disengage the pin device 258c by screwing it into and out of the receiving slot 266.

Figure 11A:
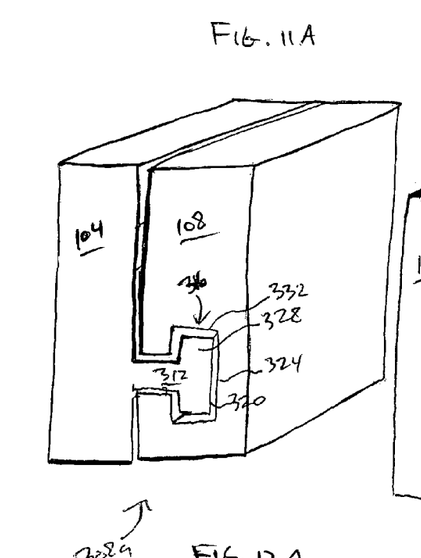
FIG. 11A depicts a partial cross-sectional, partial perspective view of an embodiment of a guide device.
Figure 11B:
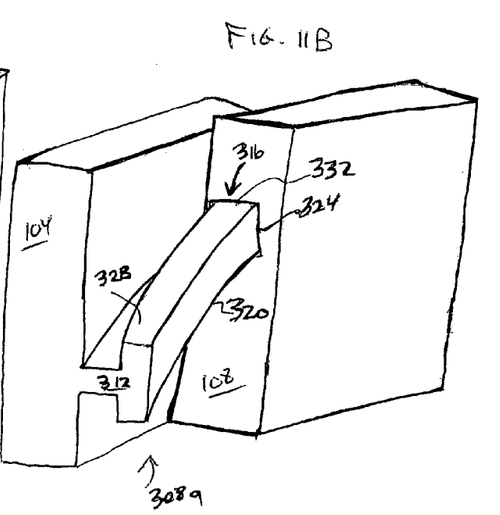
FIG. 11B depicts a partial cross-sectional, partial perspective view of the embodiment of the guide device depicted in FIG. 11A, but in which the rotatable component is rotated relative to its position in FIG. 11A.

FIGS. 11A and 11B depict an exemplary embodiment of a guide device 308a. Although exemplary embodiments are specifically described herein, many embodiments of the guide device 308 are possible. The guide device 308 guides the rotation of the rotatable component 108 relative to the anchoring component 104 during the transition from the first configuration 116 to the second configuration 120 of the rotational vehicle restraint system 92. The guide device 308 also at least in part maintains the connection of the rotatable component 108 to the anchoring component 104 during the transition from the first configuration 116 to the second configuration 120.

FIGS. 11A and 11B depict a representative square section of the anchoring component 104 and the rotatable component 108 having the exemplary embodiment of the guide device 308a, which includes a guide rail 312 and a guide track 316. FIG. 11B depicts the same embodiment depicted in FIG. 11A, but in which the rotatable component 108 has rotated relative to its position depicted in FIG. 11A. FIGS. 11A and 11B depict the anchoring component 104 as having the guide rail 312 and the rotatable component 108 as having the guide track 316, but the correspondence of the guide rail 312 and guide track 316 to the anchoring component 104 and the rotatable component 108 can also be reversed. That is, the anchoring component 104 can instead include the guide track 316 and the rotatable component 108 can include the guide rail 312.

The guide rail 312 can have a profile 320 which conformably mates to a profile 324 of the guide track 316, to provide a secure connection between the guide rail 312 and guide track 316 which is capable of withstanding variable loading that may occur during a restraint incident, such as an accident of the vehicle. The mating profiles 320, 324 can be designed to provide a connection which is able to withstand separating forces acting in various different directions. For example, the guide rail 312 can include a lip portion 328 that mates to a corresponding lip portion 332 of the guide track 316 to provide a connection which is able to withstand a separating force acting in at least a direction normal to the front surface of the rotatable component 108. In a similar manner, various protrusions of the mating profiles 320, 324 can provide resistance to separating forces acting in various other directions.

Figure 12A:
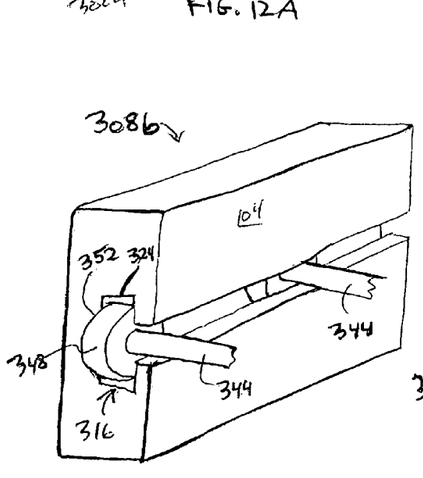
FIGS. 12A and 12B depict partial cross-sectional, partial perspective views of versions of another embodiment of the guide device.
Figure 12B:
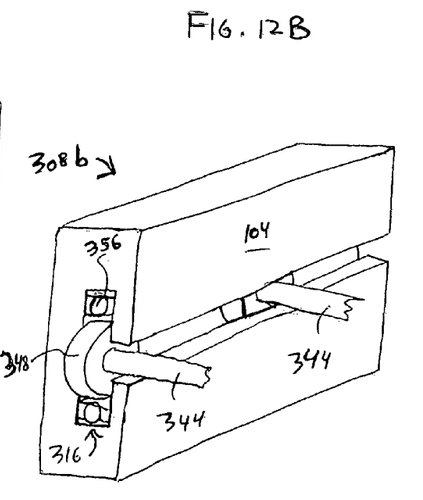
Figures 13A, 13B, 13C, 13D:
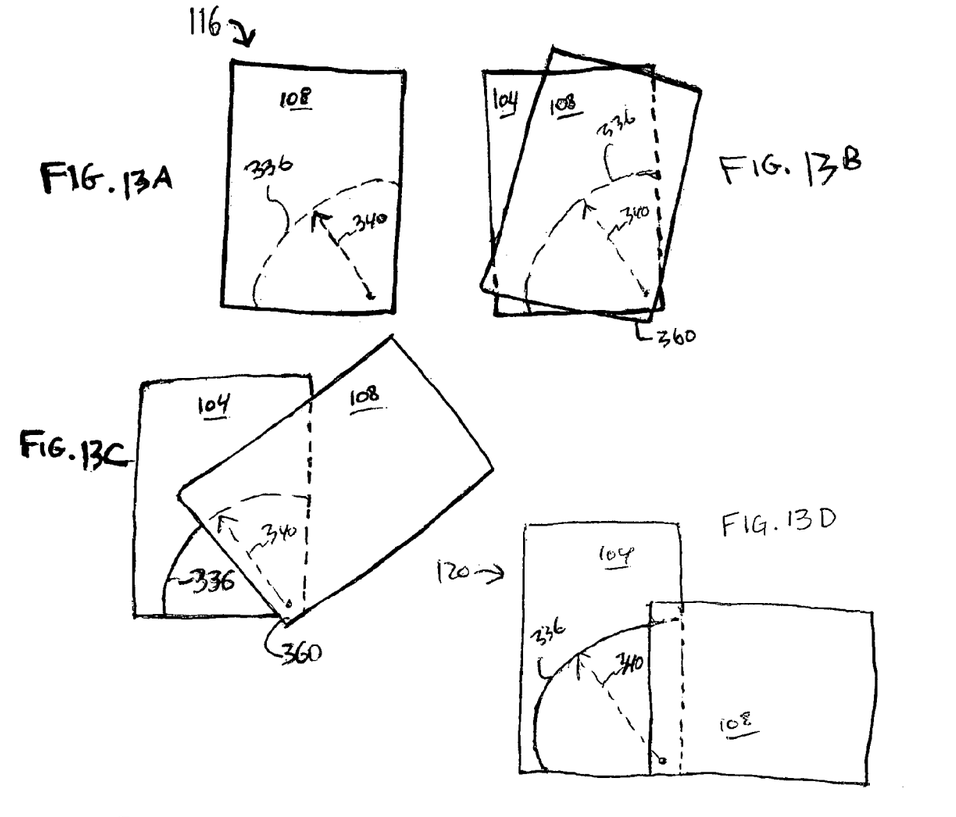
FIGS. 13A, 13B, 13C and 13D depict front and rear views of an embodiment having a path associated with the guide device.

FIGS. 12A and 12B depict representative square sections of another exemplary embodiment of the guide device 308b, which includes a guide track 316 and at least one guide pin 344 (or a plurality of guide pins 344). Here, the anchoring component 104 includes the guide track 316. Alternatively the rotatable component 108 can include the guide track 316. The guide pin 344 can include a head 348 having a profile 352 that conforms to and is retained by the guide track profile 324. Other embodiments of the guide pin 344 and head 348 are also possible. The end of the guide pin 344 opposite the head 348 can either be fixedly or movably attached to the rotatable component 108. For example, the end of the guide pin 344 opposite the head 348 can optionally be permanently attached to a particular location on the rotatable component 108, or optionally have a second head (not shown) that mates to a second guide track (not shown) of the rotatable component 108. As depicted in a second version of the second embodiment in FIG. 12B, the guide track 316 can optionally include a roller bearing 356 to reduce friction during the transition between the first and second configurations 116, 120.

The components of the guide device 308 are associated with a path 336 along the anchoring component 104. Depending on the specific embodiment of the guide device 308, the path 336 is traversed by, for example, the guide rail 312, the guide pins 344 or some other guide device component. Many embodiments of the path 336 are possible. For example, as shown in FIGS. 13A-13D, the path 336 can be circular, with a radius centered at the pivot 254. As discussed above, however, the path need not be circular.

The guide device 308 can also be designed to be associated with a variable path 336. For example, the guide rail 312, guide track 316 or guide pins 344 of the guide device can each optionally be movably located on the anchoring component 104 or the rotatable component 108. That is, for example, the guide rail 312, guide track 316 or guide pins 344 can be mounted in a corresponding dynamically positionable slot or receptacle (not shown) in the anchoring component 104 or the rotatable component 108. The dynamically positionable slot can be selectively fixed in place during the operation of the rotational vehicle restraint system 92, for example to provide an adjustable placement of the path 336, or can be dynamically positioned during the operation of the rotational vehicle restraint system 92, to provide an operationally-dynamic shape of the path 336.

Figure 14A:
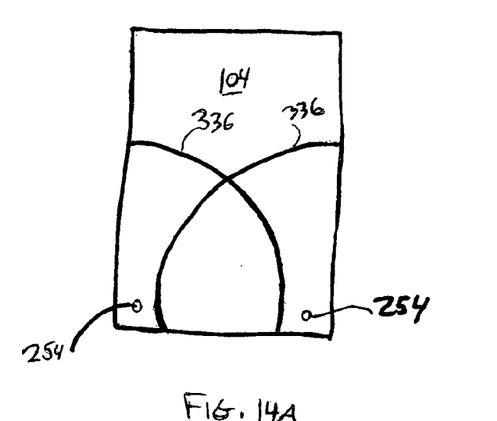
FIGS. 14A and 14B depict a rear and front view of embodiments having a plurality of paths associated with the guide device.
Figure 14B:
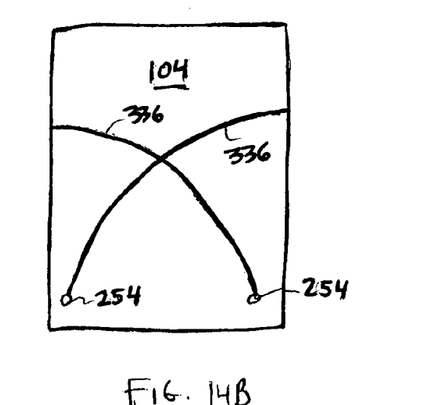

As depicted in FIGS. 14A and 14B, a plurality of guide paths 336 can each be associated with rotation about a different pivot 254 and corresponding axis of rotation 112. Each guide path 336 of the plurality of guide paths 336 is associated with a guide device 308 of a plurality of guide devices 308 that enables rotation of the rotatable component 108 relative to the anchoring component 104. The plurality of guide devices 308 can either include completely separate components or share components. For example, the anchoring component 104 can include a separate guide track 316 associated with each of the separate guide paths 336, and the rotatable component 108 can either include guide pins 344 which are capable of mating to either of the guide tracks 316, or two different sets of guide pins 344 that each mate with a particular one of the two separate guide tracks 316. Likewise, the guide rail 312 can also optionally mate to either a specific one or a plurality of different guide tracks 316.

The pivot 254 can optionally act as the guide pin 344. For example, the pin device 258 can be designed to be selectively engagable with the guide track 316 as well as with the receiving slots 266, 270. In the embodiment depicted in FIG. 14A, the depicted pivots 254 do not act as guide pins 344, and are thus not aligned with the guide paths 336. In the embodiment depicted in FIG. 14B, the pivots 254 can act as guide pins 344, and thus are aligned with the guide paths 336.

The rotational vehicle restraint system 92 is capable of being locked into the first and second configurations 116, 120 to securely restrain the passenger in either position. For example, the pivot 254, e.g. the selectively engagable pin device 258, can be used to lock the rotational vehicle restraint system 92 in either the first or second configurations 116, 120. The rotational vehicle restraint system 92 can be locked into the first configuration 116 by simultaneously engaging both pivots 254a,b to be locked into the anchoring component 104.

For purposes of locking the rotational vehicle restraint system 92 in the second configuration 120, the anchoring component can have an additional receiving slot 266 located in such a manner as to be capable of receiving the pin device 258 once the rotatable component 108 has rotated to its position in the second configuration 120.

Figure 15A:
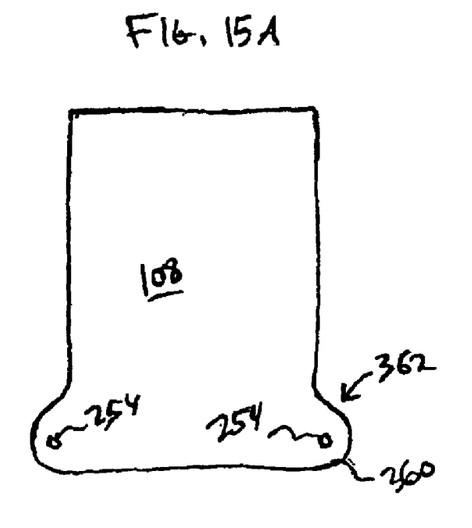
FIGS. 15A and 15B depict front and rear views of embodiments of the rotatable component having a rounded corner.
Figure 15B:
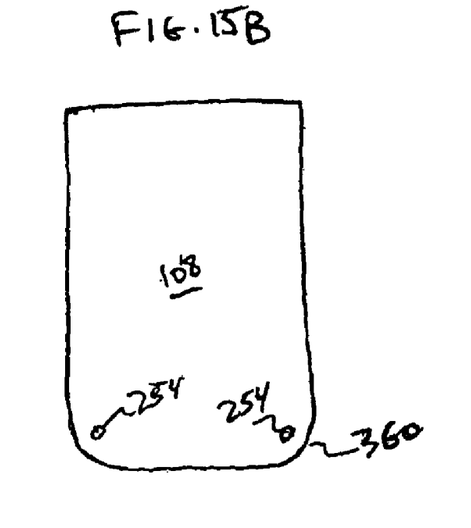

Returning to FIGS. 13A-13D, it is appreciable that a purely rectangular profile of the rotatable component 108 may result in the seat base 36 being subjected to impact by a square corner 360 of the rotatable component 108 as the rotatable component 108 transitions between the first configuration 116 and the second configuration 120. FIGS. 15A and 15B depict alternative embodiments in which the corner 360 is rounded to prevent the possibility of damage to seat base 36 during rotation of rotatable component 108.

Additionally, the embodiment depicted in FIG. 15A includes protruding portions 362 which have the rounded corners 360. The pivots 254 can be located in the protruding portions 362, which can allow them to be located beyond the width of the body of a typical passenger sitting in the upright position. Locating pivots 254, and thus axes of rotation 112, beyond the width of the body of the passenger can provide a geometric relationship between the axis of rotation 112 and the passenger's body that for some passengers may provide a beneficial ease of movement during the transition between the first configuration 116 and the second configuration 120.

Figure 16A:
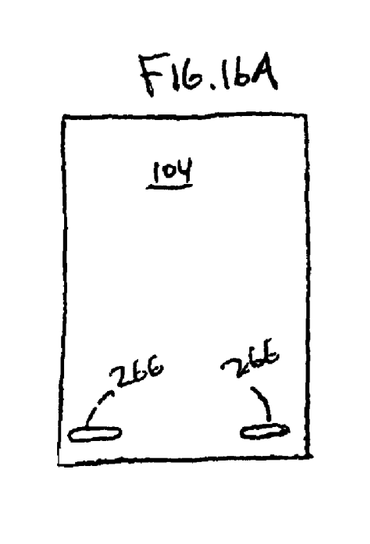
FIGS. 16A and 16B depict front views of embodiments of the anchoring component having a receiving slot allowing dynamic positioning of the pivot.
Figure 16B:
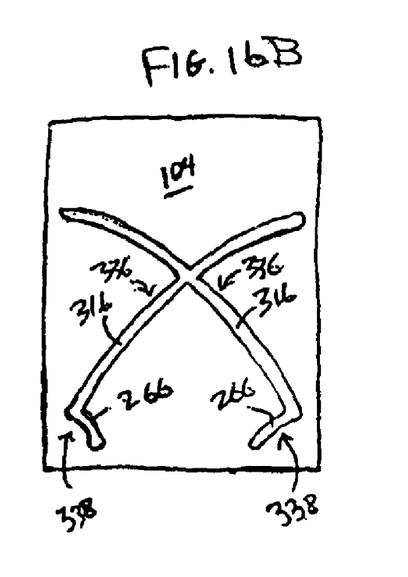

FIGS. 16A and 16B depict embodiments in which the pivot 254 can move along the receiving slot 266 in the anchoring component 104. FIG. 16A depicts an embodiment in which the position of the pivot 254 can be adjusted horizontally to accommodate differently-sized passengers who may feel more comfortable rotating about an axis of rotation 112 that has been positioned according to the specific size of their body. In other embodiments, the slot 266 can be sized to allow the pivot position to be adjusted vertically, or a combination of horizontally and vertically. FIG. 16B depicts an embodiment in which the receiving slot 266 is sized to allow movement of the engaged pivot 254 during rotation of the rotatable component 108 during the transition from the first configuration 116 to the second configuration 120. In the depicted embodiment, the receiving slot has a shape that creates a pivot guide path 338 for the engaged pivot 254 to follow while components of the guide device 308 follow the guide path 336. In one scenario, the pin device 258 of the unengaged pivot 254 follows the guide path 336, while the pin device 258 of the engaged pivot 254 follows the pivot guide path 338. In some embodiments, the receiving slot 266 can be sized to allow for both the positioning of the pivot 254 according to differently-sized passengers and the creating the pivot guide path 338.

Figure 17:
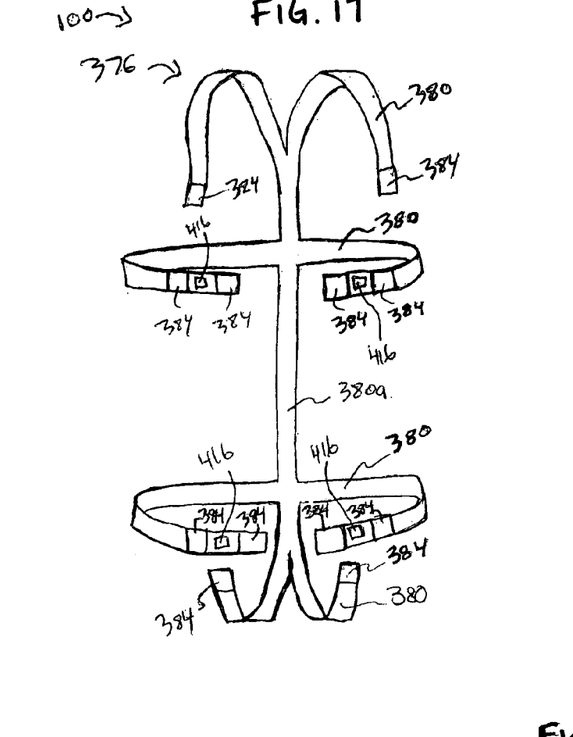
FIG. 17 depicts a perspective view of an exemplary strap harness.

The harness 100 of the rotational vehicle restraint system 92 fits about the passenger and connects the passenger to the rotatable component 108. Many embodiments of the harness 100 are possible and all are included within the scope of the invention. As depicted in FIG. 17, the harness 100 can include a strap harness 376. (The harness 100 depicted in FIGS. 2A and 2B is also a strap harness 376.) The strap harness 376 includes a plurality of straps 380 which are capable of fitting about the passenger. Straps 380 can be connected together by strap connectors 384.

Figure 18:
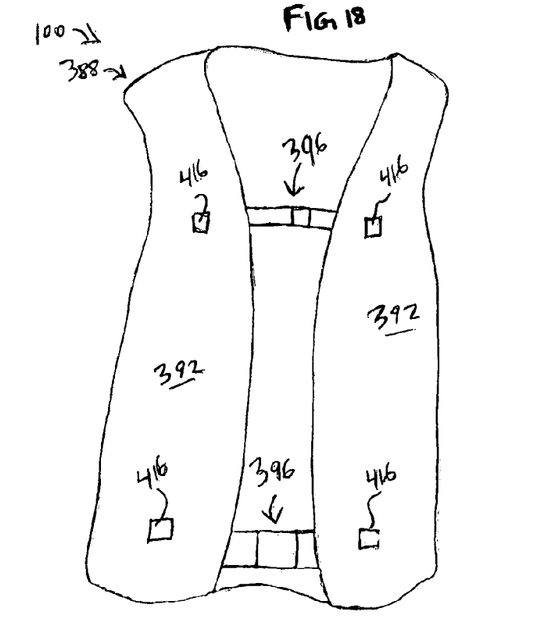
FIG. 18 depicts a perspective view of an exemplary vest harness.

In another embodiment, the harness 100 includes a vest harness 388 instead of a strap harness 376. FIG. 18 depicts one embodiment of the vest harness 388 having a vest portion 392 that is capable of fitting about the passenger and connector portions 396 that are capable of securing the vest portion 392 about the passenger.

The harness 100 is connected to the rotatable component 108 in such a way that enables substantial, yet safe freedom of movement of the passenger while the passenger is restrained. For example, the harness 100 can optionally be connected to the rotatable component 108 in such a way that the passenger wearing the harness 100 is capable of moving from a first lying down position, in which the passenger is lying facing forward in the vehicle seat assembly 20, to a second lying down position, in which the passenger is lying facing backward in the vehicle seat assembly 20, all the while being restrained by the rotational vehicle restraint system 92. That is, the enabled first and second lying down positions are rotated 180 degrees relative to each other. Such a connection between the harness 100 and the rotatable component 108 provides increased comfort to the passenger by enabling substantial choice concerning the exact nature of the lying down position of the passenger.

Figure 19A:
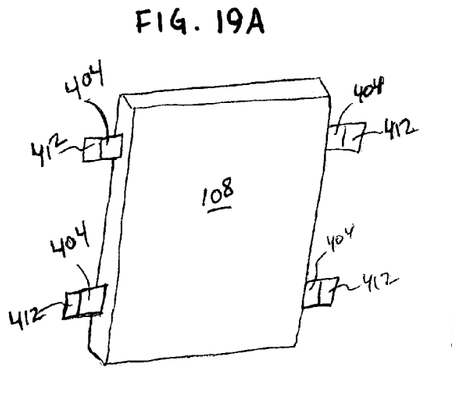
FIGS. 19A and 19B depict perspective views of an embodiment having a plurality of harness connector straps based in the rotatable component.
Figure 19B:
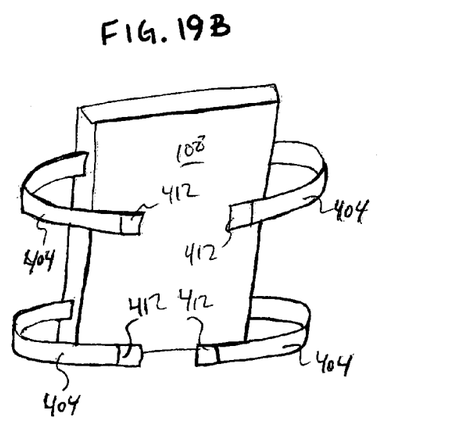

The connection between the harness 100 and the rotatable component 108 can include a plurality of harness connector straps 404 that connect the rotatable component 108 to the harness 100. FIGS. 19A and 19B depict one embodiment of the plurality of harness connector straps 404. The plurality of harness connector straps 404 are based in the rotatable component 108, and are capable of extending from and retracting back into the rotatable component 108. That is, much like conventional seat belts 44, the harness connector straps 404 can extend from the rotatable component 108 as much as necessary to enable the shifting of the passenger from the first lying down position facing forward to the second lying down position facing backward, but are also tensioned to retract into the rotatable component 108 to reduce slack and conform to the form of the passenger in either the first or second lying down positions. FIG. 19A depicts the harness connector straps 404 mostly retracted into the rotatable component 108, and FIG. 19B depicts the harness connector straps 404 at least partially extended from the rotatable component 108.

The harness connector straps 404 include connectors 412 which connect to mating connectors 416 on the harness 100. The connectors 412 of the harness connector straps 404 can include tabs 48 and the mating connectors 416 of the harness 100 can include buckles 52. Other embodiments of the harness connector strap connectors 412 and harness connectors 416 are also possible.

Figure 20:
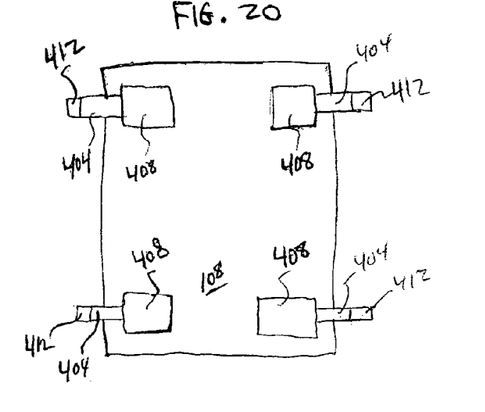
FIG. 20 depicts a rear cross-sectional view of an embodiment of a plurality of harness connector strap base units of the rotatable component.

FIG. 20 depicts a cross-sectional view of one embodiment of the rotatable component 108. The depicted embodiment includes a plurality of harness connector strap base units 408. The harness connector strap base units 408 house the harness connector straps 404. The harness connector strap base units 408 also include a tensioning device (not shown) that is capable of retracting and reducing slack in the harness connector straps 404. The harness connector strap base units 408 can also optionally include a sensor (not shown), for example an accelerometer, to determine when to prohibit further extension of the harness connector straps 404, such for example in the case of an accident of the vehicle.

Figure 21A:
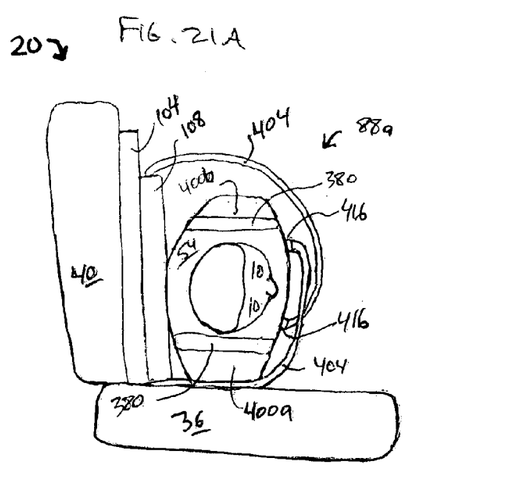
FIGS. 21A and 21B depicts side views of an embodiment of a passenger restrained by the rotational vehicle restraint system, in which the passenger is restrained in a first lying down position facing forward, as in FIG. 21A, and in which the passenger is restrained in a second lying down position facing backward, as in FIG. 21B.
Figure 21B:
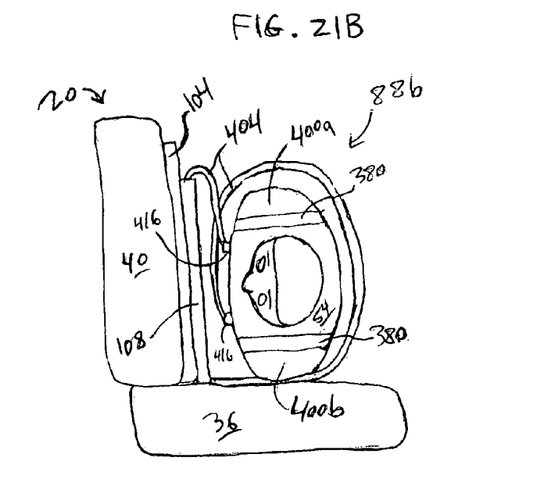

FIGS. 21A and 21B depict side views of a passenger 54 restrained by one embodiment of the rotational vehicle restraint system 92. FIG. 21A depicts the passenger 54 in the first lying down position 88a, facing forward in the vehicle seat assembly 20 with a first shoulder 400a contacting the seat base 36, and wearing the strap harness 376 which is connected to the rotatable component 108 by the harness connector straps 404. FIG. 21B depicts the passenger 54 in the second lying down position 88b, facing backward in the vehicle seat assembly 20 with his or her other shoulder 400b contacting the seat base 36, and still wearing the strap harness 376 which is connected to the rotatable component 108 by the harness connector straps 404. Due to the capability of the harness connector straps 404 to extend from and retract back into the rotatable component 108, the passenger 54 can transition from the first lying down position 88a to the second lying down position 88b, with the harness 100 all the while being connected to the rotatable component 108 by the harness connector straps 404.

The harness connector straps 404 can be attached to the harness 100 in a variety of ways. For example, two upper harness connector straps 404 can be attached to two upper harness connectors 416 and two lower harness connector straps 404 can be attached to two lower harness connectors 416. In the embodiment depicted in FIG. 21A, the harness connector straps 404 are connected to the harness connectors 416 by first at least partially crossing over the front of the passenger 54 when in the first lying down position 88a. That is, in the embodiment depicted in FIG. 21A, a right harness connector strap 404 crosses over the front of the passenger 54 to connect to a left harness connector 416, and a left harness connector strap 404 crosses over the front of the passenger 54 to connect to a right harness connector 416. In this embodiment, the crossover connection of the harness connector straps 404 occurs for each of the plurality of harness connector straps 404, i.e., for both the upper and lower harness connector straps 404. One benefit of the crossover connection of the harness connector straps 404 is the tensioning of the harness connector straps 404 restrains the passenger 54 in both the first and second lying down positions 88a, 88b, due to the geometry of the straps in each position. In alternative embodiments, however, the harness connector straps 404 do not cross over the front of the passenger 54, but can instead connect to the more proximal harness connectors 416, as shown in the embodiment depicted in FIGS. 2A and 2B.

Other embodiments of the harness connector straps 404 are also possible. For example, in one embodiment the harness connector strap 404 includes a strap which connects the front surface 164 of the rotatable component 108 to a back of the harness 100, e.g., to a back strap 380a. Such a harness connector strap 404 can be a fixed length strap that includes enough slack to enable some movement of the passenger 54, but which also suitably restrains the passenger 54 in the event of an accident. Such a harness connector strap 404 can, e.g., connect to a slot in the front surface 164 of the rotatable component 108, the slot optionally enabling flexible positioning of the connection of the harness connector strap 404 to the front surface 164.

Further embodiments are also possible, which are the result of variously combining elements or embodiments described herein. For example, in one embodiment, the rotational vehicle restraint system 92 can be installed by a manufacturer of the vehicle, and be integral to the vehicle seat assembly 20. In such an embodiment, the anchoring component can optionally be part of the backrest 40 of the vehicle seat assembly 20.

What is claimed is:

1. A rotational vehicle restraint system, comprising:
 a substantially rectangular anchoring panel configured to be attached to a vehicle seat assembly;
 a plurality of anchoring connectors, including a top anchoring connector and a bottom anchoring connector, configured to attach top and bottom portions of the anchoring panel to the vehicle seat assembly;
 a substantially rectangular rotatable panel attached to the anchoring panel, wherein the rotatable panel is configured to rotate relative to the anchoring panel individually about each of a plurality of selectively-engagable pivots;

a harness connected to the rotatable panel and configured to fit about a passenger, wherein the harness comprises at least one of: a strap harness, or a vest harness;

a plurality of harness connector straps configured to connect the harness to the rotatable panel, wherein the harness connector straps are retractably-based in a plurality of harness connector strap base units in the rotatable panel;

a guide device including a guide track and at least one of:
- a guide rail configured to move along the guide track during rotation of the rotatable panel relative to the anchoring panel, or
- a guide pin configured to move along the guide track during rotation of the rotatable panel relative to the anchoring panel;

wherein the guide device is connected to the anchoring panel and the rotatable panel; and wherein the rotational vehicle restraint system, when installed in a vehicle, is configured to:
- restrain a passenger fitted with the harness in both an upright position and a lying down position; and
- enable the passenger fitted with the harness to change from a first lying down position facing forward in the vehicle seat assembly to a second lying down position facing backward in the vehicle seat assembly, wherein, when the passenger changes from the first lying down position to the second lying down position, one of the plurality of harness connector straps extends further from the rotatable component and another of the plurality of harness connector straps retracts at least partially into the rotatable component.

2. A rotational vehicle restraint system, comprising:

an anchoring component configured to be attached to a vehicle seat assembly;

a rotatable component attached to the anchoring component, wherein the attached rotatable component is capable of rotating relative to the anchoring component about an axis of rotation;

a harness connected to the rotatable component and capable of fitting about a passenger; and a plurality of harness connector straps that are retractably-based in the rotatable component and connect the harness to the rotatable component, wherein the rotational vehicle restraint system, when installed in a vehicle, is capable of restraining a passenger fitted with the harness while the passenger changes from an upright position to a lying down position, and while the passenger changes from a first lying down position facing forward to a second lying down position facing backward, all without releasing the passenger from the harness, wherein, when the passenger changes from the first lying down position to the second lying down position, one of the plurality of harness connector straps extends further from the rotatable component and another of the plurality of harness connector straps retracts at least partially into the rotatable component.

3. The rotational vehicle restraint system of claim 2, wherein the rotatable component is configured to rotate from a first position, which enables the passenger to sit upright, to a second position, which enables the passenger to lie down, without releasing the passenger from the rotational vehicle restraint system, and with the rotatable component remaining attached to the anchoring component.

4. The rotational vehicle restraint system of claim 2, further comprising a guide device connected to the anchoring component and the rotatable component, the guide device including:
- a guide track of at least one of: the anchoring component or the rotatable component; and
- at least one of: at least one guide rail configured to move along the guide track during rotation of the rotatable component, or at least one guide pin configured to move along the guide track during rotation of the rotatable component.

5. The rotational vehicle restraint system of claim 2, wherein the anchoring component and the rotatable component comprise panels which substantially align with each other in a first configuration that enables the passenger to sit upright.

6. The rotational vehicle restraint system of claim 2, further comprising: a selectively-engagable pivot, about which the rotatable component rotates relative to the anchoring component.

7. The rotational vehicle restraint system of claim 6, wherein the selectively-engagable pivot comprises a pin device having a rod with at least one of: a permanently protruding tab, a retractable protruding tab, or a thread.

8. The rotational vehicle restraint system of claim 2, wherein the harness comprises at least one of:
- a strap harness, or
- a vest harness having a vest portion configured to fit about the passenger.

9. The rotational vehicle restraint system of claim 2, wherein the rotatable component comprises at least one of: a contoured front surface, or a cushioned layer.

10. A rotational vehicle restraint system, comprising:

an anchoring component configured to be attached to a vehicle seat assembly;

a rotatable component attached to the anchoring component, wherein the attached rotatable component is capable of rotating relative to the anchoring component about an axis of rotation;

a harness connected to the rotatable component and capable of fitting about a passenger, wherein the rotational vehicle restraint system, when installed in a vehicle, is capable of restraining a passenger fitted with the harness in both an upright position and a lying down position;

wherein the harness is connected to the rotatable component by a plurality of harness connector straps that are retractably-based in the rotatable component, the plurality of harness connector straps including:
- a first harness connector strap configured to extend from a left side of the rotatable component, about the front of the torso of the passenger, to attach to a right portion of the harness; and
- a second harness connector strap configured to extend from a right side of the rotatable component, about the front of the torso of the passenger, to attach to a left portion of the harness;

wherein, when the passenger changes from a first lying down position facing forward in the vehicle seat assembly to a second lying down position facing backward in the vehicle seat assembly, one of the plurality of harness connector straps extends further from the rotatable component and another of the plurality of harness connector straps retracts at least partially into the rotatable component.

11. The rotational vehicle restraint system of claim 10, further comprising a plurality of harness connector strap base units, each base unit including:

- a tensioning device configured to retract the harness connector strap into the base unit to reduce excess slack in the harness connector strap; and
- a sensor configured to determine when to prohibit further extension of the harness connector strap.

12. A rotational vehicle restraint system, comprising:

an anchoring component configured to be attached to a vehicle seat assembly;

a rotatable component attached to the anchoring component, wherein the attached rotatable component is capable of rotating relative to the anchoring component about an axis of rotation;

a harness connected to the rotatable component and capable of fitting about a passenger; and a plurality of different guide devices connected to the anchoring component and the rotatable component, each guide device including:

- a guide track attached to exactly one of: the anchoring component or the rotatable component; and
- a guide device portion attached to the other of the anchoring component and the rotatable component not attached to the guide track, the guide device portion configured to necessarily move along the guide track during rotation of the rotatable component, and wherein the guide device portion includes at least one of: a guide pin or a guide rail;

a plurality of selectively engagable pivots, separate from the guide device and configured to be engaged and disengaged by the passenger, and about each of which the rotatable component and at least a portion of the guide device rotate during rotation of the rotatable component and when the pivot is engaged, wherein each selectively engagable pivot is correspondingly paired to a different one of the guide devices, and each selectively engagable pivot provides a different one of a plurality of different axes of rotation about which the rotatable component and at least a portion of the corresponding guide device are configured to rotate during rotation of the rotatable component when that pivot is engaged;

wherein the rotational vehicle restraint system, when installed in a vehicle, is capable of restraining a passenger fitted with the harness while the passenger changes from an upright position to a lying down position, without releasing the passenger from the harness.

13. The rotational vehicle restraint system of claim 12, wherein the at least a portion of the guide device rotates about the selectively engagable pivot at a predetermined distance offset from the pivot in a plane perpendicular to the axis of rotation.

14. The rotational vehicle restraint system of claim 12, wherein, while the passenger changes from the upright to the lying down position, the guide device portion necessarily moves along the guide track in an arc occupying a plane perpendicular to the axis of rotation.

\* \* \* \* \*